United States Patent [19]

Marchart

[11] Patent Number: 5,694,987
[45] Date of Patent: Dec. 9, 1997

[54] DEVICE AND PROCESS FOR INFLATING A PNEUMATIC TIRE

[75] Inventor: Horst Marchart, Stuttgart, Germany

[73] Assignee: Dr. Ing. h.c.F. Porsche AG, Germany

[21] Appl. No.: 688,175

[22] Filed: Jul. 29, 1996

[30] Foreign Application Priority Data

Jul. 29, 1995 [DE] Germany ............... 195 27 894.1

[51] Int. Cl.⁶ ..................................... B65B 31/00
[52] U.S. Cl. ..................... 141/38; 141/5; 141/46; 340/442
[58] Field of Search ..................... 141/38, 46, 67, 141/83, 94, 5; 152/415, 416, 417, 501–506; 340/438, 442

[56] References Cited

U.S. PATENT DOCUMENTS 2,750,071  6/1956  Ritchie .......................... 222/3
4,520,344  5/1985  Shu et al. ....................... 340/442
5,403,417  4/1995  Dudley et al. ................... 141/38

FOREIGN PATENT DOCUMENTS 0 022 258 A1  7/1980  European Pat. Off. .
2 216 516  8/1974  France .

*Primary Examiner*—Henry J. Pecla
*Assistant Examiner*—Timothy L. Maust
*Attorney, Agent, or Firm*—Evenson, McKeown, Edwards & Lenahan P.L.L.C.

[57] ABSTRACT

By means of the device and the process, a defective pneumatic tire of the vehicle is provided with emergency running properties. This takes place by means of an inflating device, after the removal of which from the loading space, a signal is triggered, which constantly reminds the driver to move the vehicle only within the range of predetermined speeds. By means of the process, it is ensured that improper actions which would be possible in connection with the pneumatic tire with emergency running properties, are largely avoided.

15 Claims, 2 Drawing Sheets

DEVICE AND PROCESS FOR INFLATING A PNEUMATIC TIRE

BACKGROUND AND SUMMARY OF THE INVENTION

This invention relates to a device and a process for inflating a pneumatic tire through the use of an inflating device.

In the case of a known passenger car—for example, the Ferrari 355 GTS—, an inflating bottle is carried along in the vehicle which can be used to bring a pneumatic tire suffering an unusual loss of pressure into a condition in which it has emergency running properties. By means of the inflating bottle, which comprises a sealing as well as a pressure medium, a spare wheel/tire can be eliminated. However, this advantage also has a drawback in that the driver receives no permanent information as to the fact that, on the one hand,—because of the pneumatic tire with emergency running properties—he must drive only at a clearly reduced speed and, on the other hand, the above-mentioned pneumatic tire must be replaced by a fully operable pneumatic tire.

French Patent Document FR-PS 2 216 516 and European Patent Document EP-PS 0 022 258 A1 relate to inflating bottles for pneumatic tires which receive and deliver only a pressure medium and do not contribute to the above-mentioned safety-relevant criteria.

It is therefore an object of the invention to provide an arrangement and a process by means of which a defective pneumatic tire may be given emergency running properties and the driver of the vehicle is not only informed of this condition of the pneumatic tire but is also instructed to replace it with a fully operable tire.

This and other objects have been achieved by providing a process and a device for inflating a deflated pneumatic tire of a vehicle, comprising an inflating device containing a sealing medium and a pressure medium to be inserted into the deflated tire, wherein the inflating device is detachably fastened in a loading space of the vehicle by at least one holding device which is connected to the inflating device and which engages a respective receiving device arranged in the loading space, the inflating device interacting with an electric switch which is configured to trigger at least one of a visual signal and an audible signal after the inflating device is removed from the loading space.

According to one preferred embodiment of the present invention, an arrangement is provided for warning a vehicle driver that a pneumatic tire needs to be replaced, comprising: an inflating device containing a sealing medium and a pressure medium, said inflating device being configured to insert said sealing medium and said pressure medium into a deflated tire of a vehicle; a loading space in said vehicle which is configured to house said inflating device in a storage position, said inflating device being removable from said loading space to inflate said deflated tire; at least one receiving device arranged in said loading space which detachably engages said inflating device; and an electric switch arranged in said loading space to interact with said inflating device in said storage position to maintain said electric switch in a deactivated position, said electric switch 11 being arranged to trigger at least one of a visual signal and an audible signal when said inflating device is removed from said loading space.

The main advantages achieved by the invention are that, as a result of the inflating device, a spare wheel/tire can be eliminated. The inflating device, which comprises an inflating bottle, contains a sealing and a pressure medium, and is easily being held on detachable holding devices and interacts with an electric switch. If the driver notices an unusual pressure loss in a pneumatic tire, by visual inspection or by a tire pressure control system, he takes the inflating device out of an easily accessible loading space of the motor vehicle. After the inflating device is taken out, the electric switch is switched such that a visual or audible signal is generated. The visual signal may be represented by a display of "90 km/h max" on the control panel, or some other safe maximum speed. In addition, a catch of a blocking device under the effect of a spring in the loading space will take up a blocking position and a coding device is activated. After the inflation of the tire suffering an unusual loss of pressure, the driver is urged, as the result of the signals or display, the blocking device and the coding device, to exchange the pneumatic tire having only the emergency running properties as soon as possible for a fully operable tire. The blocking device and the coding device can be integrated into a vehicle at reasonable expenditures.

By the use of the process for inflating the pneumatic tire, it is ensured that the driver is constantly informed of the removed inflating device and the pneumatic tire with emergency running properties and the requirements of replacing the above-mentioned pneumatic tire with a completely operable one are pointed out to him.

Other objects, advantages and novel features of the present invention will become apparent from the following detailed description of the invention when considered in conjunction with the accompanying drawings.

DETAILED DESCRIPTION OF THE DRAWINGS

Figure 1:
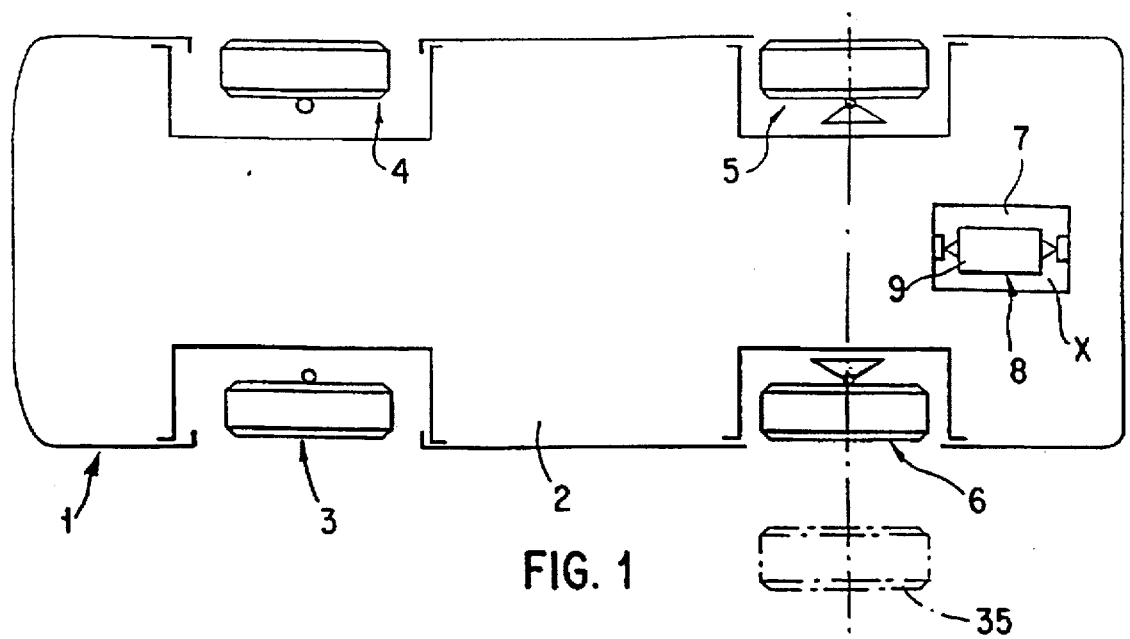
FIG. 1 is a schematic top view of a vehicle having an inflating device according to a preferred embodiment of the present invention.
Figure 2:
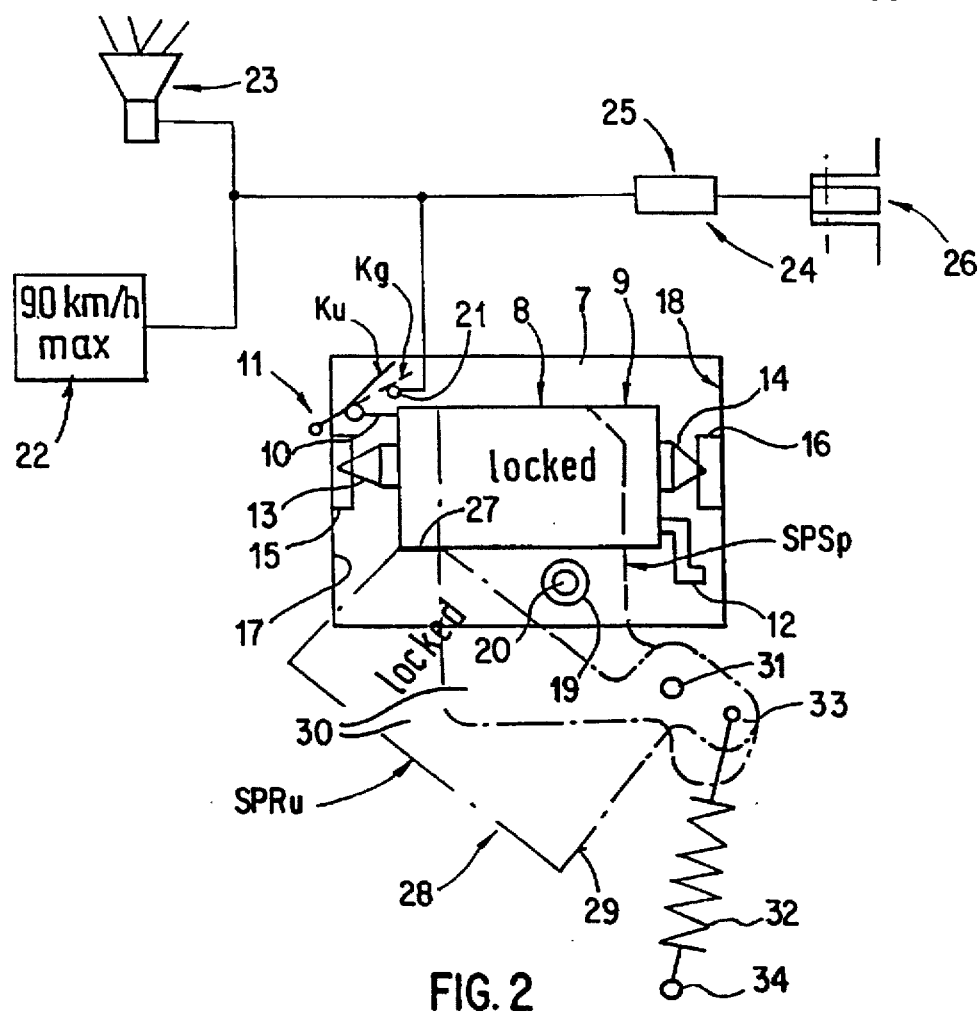
FIG. 2 is an enlarged detail view of area X of FIG. 1.
Figure 3:
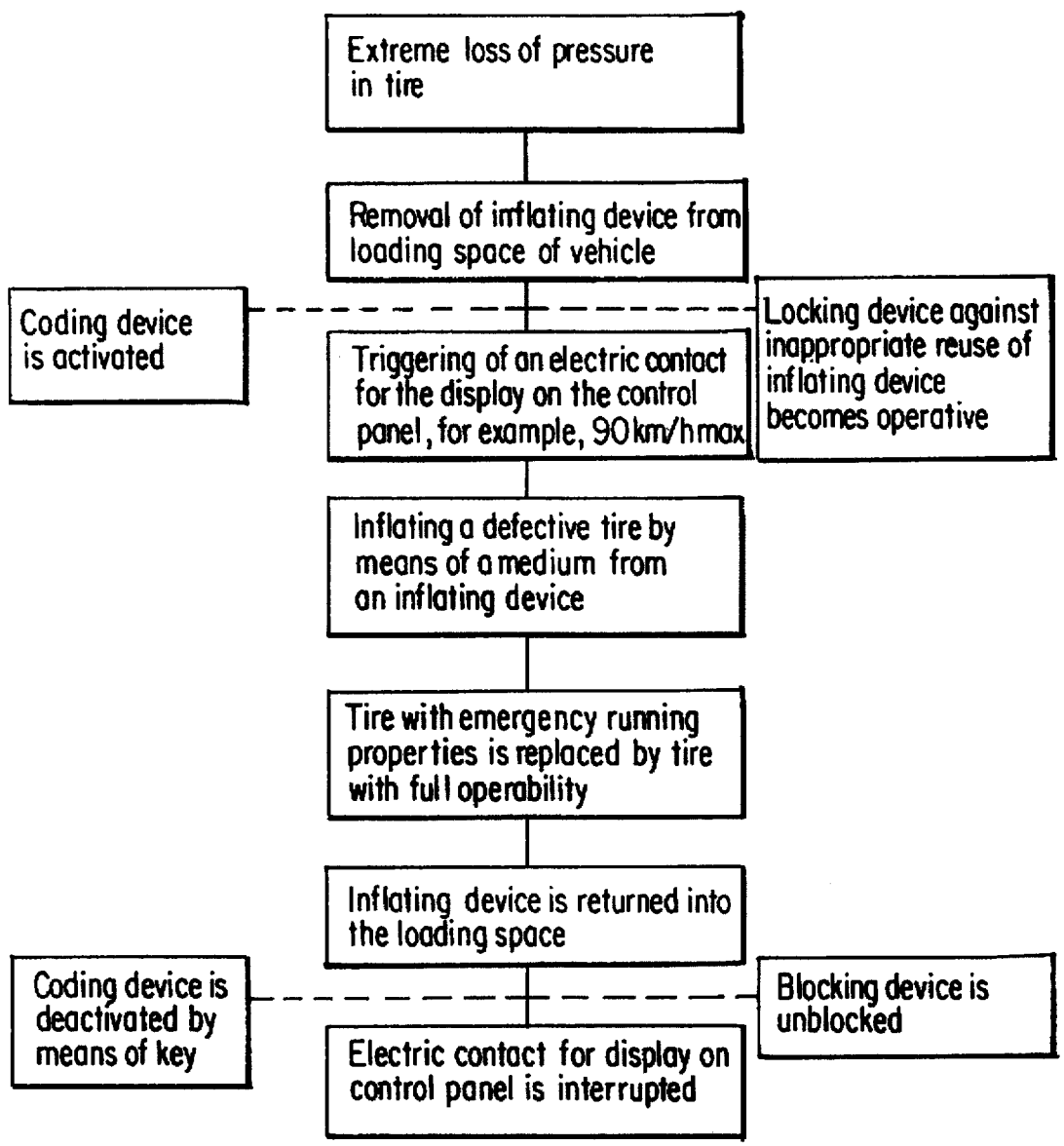
FIG. 3 is a flow chart showing the steps of the process according to the present invention.

A motor vehicle 1 comprises a floor system 2 which is carried by four air-filled tires 3, 4, 5 and 6. The tires 3, 4 are assigned to steerable wheels and the tires 5, 6 are not steerable.

Reference number 7 shows a loading space in which an inflating device 8 is housed. The inflating device 8 is an inflating bottle 9 in which a sealing and a pressure medium are stored for inflating a tire, for example, tire 6. The inflating device 8 has a supporting element 10 for an electric switch 11, an inflating tube 12 with a valve, which is not shown, and holding devices 13, 14 which are easily detachable or constructed as snap closures or axially displaceable pins and engage in receiving devices 15, 16. The receiving devices 15, 16 are arranged on opposite walls 17, 18 of the loading space 7. For the alignment of the inflating device 8 in the correct position with respect to the electric switch 11, a fixing ring 19 is used which is mounted on the inflating device 8 and surrounds a pin 20 fixed to the vehicle.

The electric switch 11 comprises two operating positions Ku and Kg: Ku means that the contact is interrupted; Kg means that the contact is closed. The electric switch 11 may also be integrated in the holding devices 13, 14 or the receiving devices 15, 16, in the embodiment, a contact element 21 for the switch 11 being connected to consuming devices 22, 23, 24.

As a function of the position of the switch 11, the consuming devices 22, 23 generate signals: Consuming device 22 emits a visual signal, for example, "90 km/h max" to a display of a control panel of the vehicle which is not shown; consuming device 23 emits an audible signal, for example, an audible instruction "check pneumatic tire".

Consuming device 24 is a coding device 25 which can be deactivated by means of a finger switch 26 such as a key, push button or the like. The coding device 25 stores information regarding whether the switch 11 has been activated, so that after the inflating device 8 has been returned to the loading space 7 and the switch 11 has been deactivated, the coding device retains the information that the switch 11 had been activated until the coding device 25 is reset.

At reference number 27, a spring-loaded blocking device 28 is supported on the inflating device 8 and comprises a blocking element 29. The blocking element 29 has a blocking plate 30, a swivel bearing 31 and a tension spring 32 which, at reference number 33 is applied to the blocking element 29 and, at reference number 34, is applied to a section fixed to the vehicle.

After the inflating device 8 is taken out of the loading space 7, the blocking element 29 moves out of position SPRu—blocking element in inoperative position—into position SPSp—blocking element in blocking position. In addition, the switch 11 moves from the position Ku to the position Kg, whereby the consuming devices 22, 23, 24 are activated; that is they generate signals and/or store the change of position of the inflating device 8.

The following process steps are suitable for an incidental utilization of the inflating device 8:

After an unusual pressure loss of a pneumatic tire, for example tire 6, is detected, the inflating device 8 is detached by way of the holding devices 13, 14 from the receiving devices 15, 16 and is taken out of the loading space 7;

as the result of the removal of the inflating device 8, the electric switch 11 switches and the visual and/or audible signal is triggered;

by means of the inflating device 8, the defective tire 6 is brought into a condition having emergency running properties by the entering of the sealing and the pressure medium;

the pneumatic tire with the emergency running properties is replaced by an operable pneumatic tire;

the inflating device 8 is returned to the loading space 7 by means of the holding devices 13, 14 and the receiving devices 15, 16;

the electric switch 11 interrupts the signals to the consuming devices 22, 23, 24.

After the removal of the inflating device 8, the blocking device 28 with its blocking element 29 is automatically—under the effect of the spring 32—guided into the loading space 7 and/or the coding device 25 is activated. For a reuse of the inflating device 8, the blocking element 28 must be manually moved into the unblocked inoperative position SPRu. Finally, after the reuse of the inflating device 8, the coding device 25 can be deactivated by means of the finger switch 26; that is, it can subsequently be determined by authorized technical personnel whether the finger key had been activated.

Although the invention has been described and illustrated in detail, it is to be clearly understood that the same is by way of illustration and example, and is not to be taken byway of limitation. The spirit and scope of the present invention are to be limited only by the terms of the appended claims.

What is claimed is:

1. Device for inflating a deflated pneumatic tire of a vehicle, comprising an inflating device containing a sealing medium and a pressure medium to be inserted into the deflated tire, wherein the inflating device is detachably fastened in a loading space adapted to be disposed in the vehicle by at least one holding device which is connected to the inflating device and which engages a respective receiving device arranged in the loading space, the inflating device interacting with an electric switch which is configured to trigger at least one of a visual signal and an audible signal after the inflating device is removed from the loading space.

2. Device according to claim 1, wherein the holding devices are configured in the form of snap closures to be easily detachable from the receiving devices of the loading space.

3. Device according to claim 1, wherein the inflating device is an inflating bottle, and wherein the holding devices are arranged between walls of the loading space and the inflating bottle.

4. Device according to claim 2, wherein the inflating device is an inflating bottle, and wherein the holding devices are arranged between walls of the loading space and the inflating bottle.

5. Device according to claim 1, wherein the visual signal displays a maximum permissible speed on a display of a control panel of the vehicle.

6. Device according to claim 1, further comprising a blocking device arranged to intervene in the loading space after the inflating device is removed from the loading space.

7. Device according to claim 5, wherein the blocking device comprises a spring-loaded blocking element which is biased to automatically enter the loading space after the inflating device is removed.

8. Device according to claim 1, further comprising a coding device which is activated by the electric switch and which can be deactivated by a manually-operable switch.

9. Process for inflating a deflated pneumatic tire of a vehicle with an inflating device containing a sealing medium and a pressure medium to be inserted into the deflated tire, the inflating device being fastened in a loading space of the vehicle by at least one holding device which is connected to the inflating device and which detachably engages a respective receiving device arranged in the loading space, the inflating device interacting with an electric switch which is configured to trigger at least one of a visual signal and an audible signal after the inflating device is removed from the loading space, said process comprising the steps of:

(a) detaching the inflating device by way of the holding devices from the receiving devices and removing the inflating device from the loading space;

(b) switching on the electric switch to trigger the at least one of a visual signal and an audible signal;

(c) inflating said deflated tire by inserting the sealing medium and the pressure medium into said deflated tire;

(d) replacing said pneumatic tire with a fully operable pneumatic tire;

(e) returning the inflating device to the loading space by engaging the holding devices into the receiving devices;

(f) switching off the electric switch to interrupt the at least one of a visual signal and an audible signal.

10. Process according to claim 9, further comprising the step of, after step (a), automatically blocking the loading space with a blocking device.

11. Process according to claim 9, further comprising the step of, after step (a), activating a coding device.

12. Process according to claim 10, further comprising the step of, prior to step (e), moving the blocking device into an inoperative position in which the loading space is not blocked.

13. Process according to claim 11, further comprising the step of, after step (e), deactivating said coding device.

14. An arrangement for warning a vehicle driver that a pneumatic tire needs to be replaced, comprising:

- an inflating device containing a sealing medium and a pressure medium, said inflating device being configured to insert said sealing medium and said pressure medium into a deflated tire of a vehicle;
- a loading space adapted to be disposed in said vehicle which is configured to house said inflating device in a storage position, said inflating device being removable from said loading space to inflate said deflated tire;
- at least one receiving device arranged in said loading space which detachably engages said inflating device; and
- an electric switch arranged in said loading space to interact with said inflating device in said storage position to maintain said electric switch in a deactivated position, said electric switch being arranged to trigger at least one of a visual signal and an audible signal when said inflating device is removed from said loading space.

15. An arrangement according to claim 14, wherein said inflating device comprises at least one holding device which engages said at least one receiving device.

* * * * *